(No Model.) 4 Sheets—Sheet 1.
D. L. BARNES
BRAKE BEAM.

No. 528,522. Patented Nov. 6, 1894.

WITNESSES:
T. J. Hogan
F. E. Galtner

INVENTOR:
David L. Barnes,
by J. Snowden Bell,
Atty.

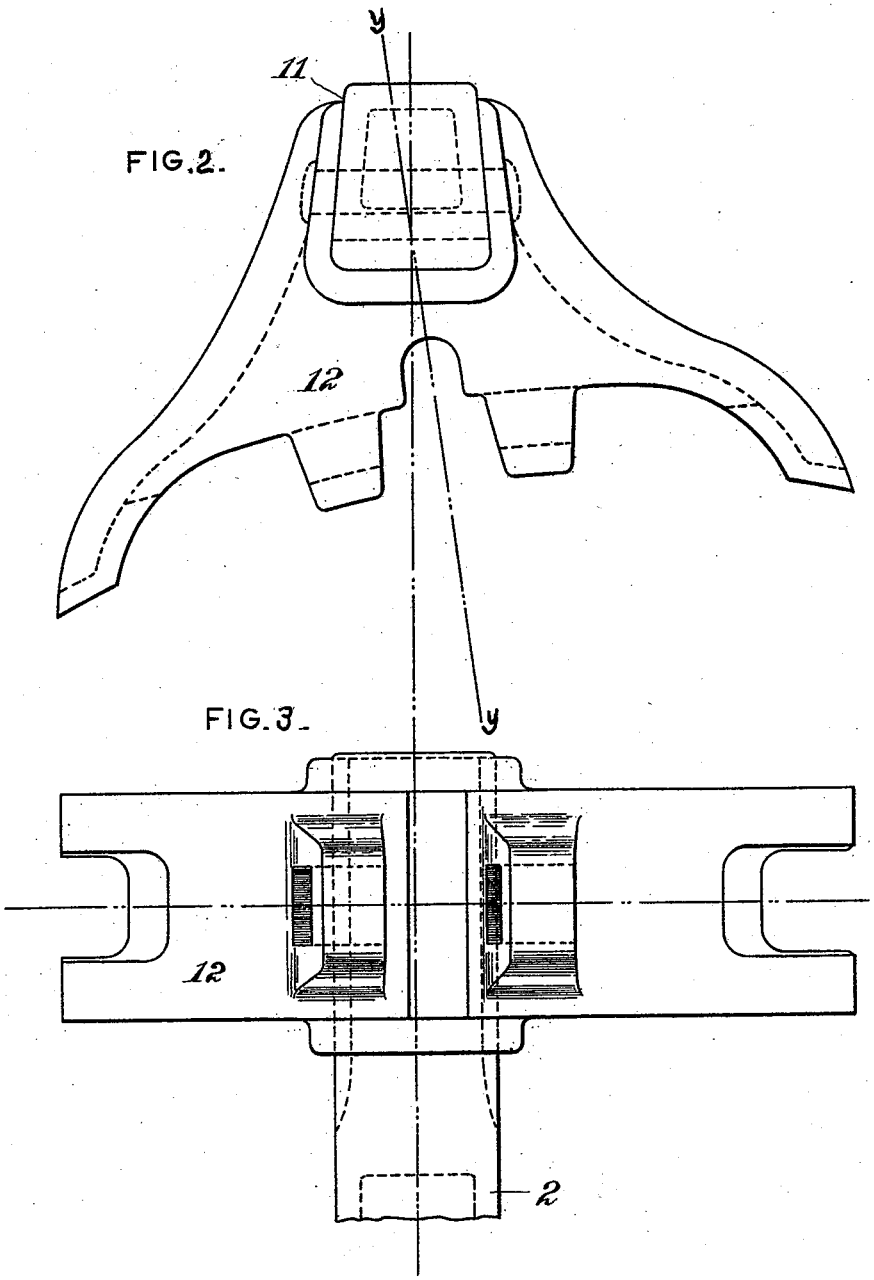

(No Model.) 4 Sheets—Sheet 3.
D. L. BARNES.
BRAKE BEAM.

No. 528,522. Patented Nov. 6, 1894.

WITNESSES:
T. J. Hogan.
F. E. Gaither.

INVENTOR
David L. Barnes,
by J. Snowden Bell
atty.

(No Model.) 4 Sheets—Sheet 4.
D. L. BARNES.
BRAKE BEAM.
No. 528,522. Patented Nov. 6, 1894.
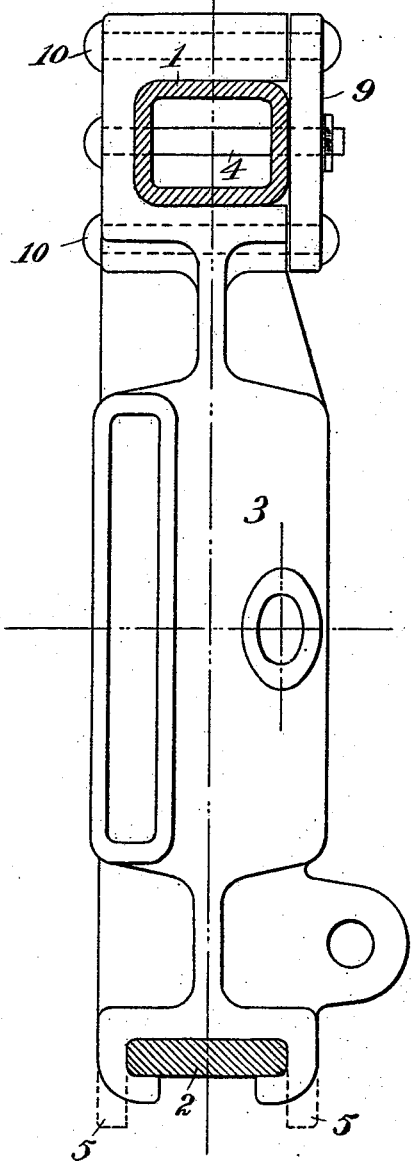
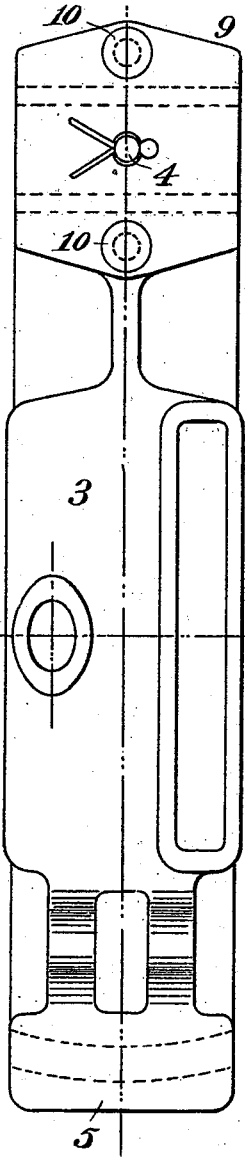
WITNESSES:
T. J. Hogan.
F. E. Gaither.
INVENTOR:
David L. Barnes,
by J. Snowden Bell.
Atty.

UNITED STATES PATENT OFFICE.

DAVID L. BARNES, OF CHICAGO, ILLINOIS.

BRAKE-BEAM.

SPECIFICATION forming part of Letters Patent No. 528,522, dated November 6, 1894.

Application filed May 22, 1894. Serial No. 512,084. (No model.)

*To all whom it may concern:*

Be it known that I, DAVID L. BARNES, of Chicago, in the county of Cook and State of Illinois, have invented a certain new and useful Improvement in Brake-Beams, of which improvement the following is a specification.

My invention relates to brake beams of the general class or type exemplified in Letters Patent No. 450,948, granted to E. H. Frost, as assignee of myself, dated April 21, 1891, and its object is to provide a brake beam from which a brake head or heads can be removed without affecting the integrality of the brake beam, and the substitution of a new brake head or heads can be readily made by any ordinary car repairer.

A further object of my invention is to provide improved means for effecting the desired tension and holding the tension member securely in position.

The improvement claimed is hereinafter fully set forth.

Figure 1:
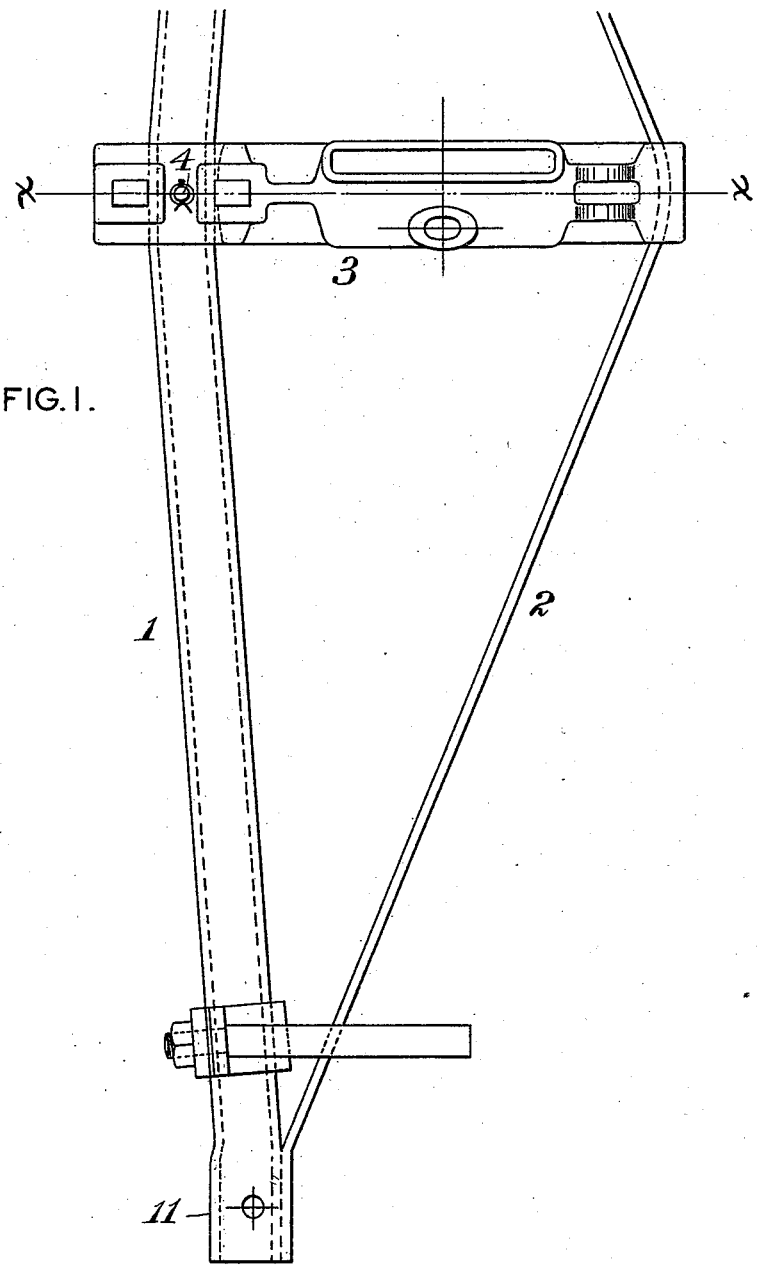
Figure 4:
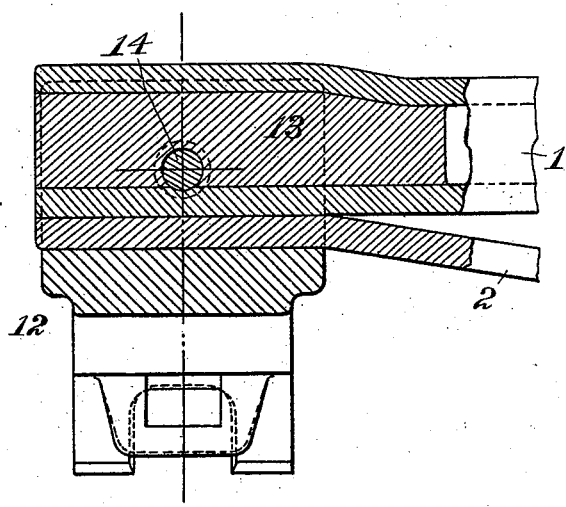
Figure 5:
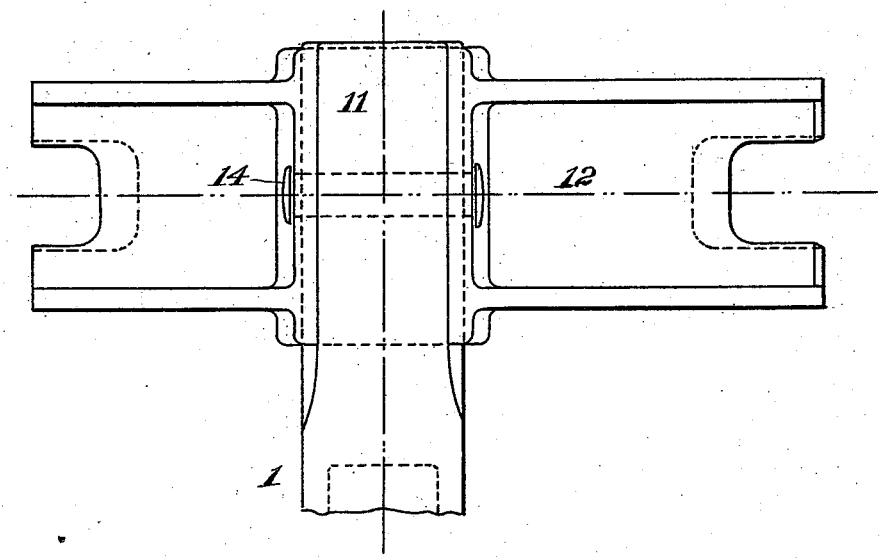

In the accompanying drawings: Figure 1 is a plan or top view of a brake beam embodying my invention, a portion, not differing from that shown, being omitted; Fig. 2, an end view of the body of the beam and a brake head thereon; Fig. 3, a side view of an end portion of the body of the beam and a face view of the attached brake head; Fig. 4, a longitudinal section, at the line $y, y$, of Fig. 2; Fig. 5, a view similar to Fig. 3, but taken from the opposite side of the brake beam; Fig. 6, a transverse section on an enlarged scale, at the line $x, x$, of Fig. 1, and Fig. 7, a plan view of the strut and connections shown in Fig. 6.

In the practice of my invention, I provide a brake beam having a main body 1, a truss bar 2, and a strut or post 3, the general form and relation of which correspond substantially with the structure of Patent No. 450,948 aforesaid. The body 1, which acts as a compression member, is, as in said patent, of tubular form, and, preferably, of square or rectangular section, and is bent at a slight angle, from its center to or near each of its ends, and the truss bar 2, which acts as a tension member, and is preferably of malleable iron, is connected, at each of its ends, to the body 1 as presently to be described, and is held, at its central portion, at the desired distance from its body, by the strut or post 3.

Lateral movement of the strut 3 on the body 1, may be prevented either by a pin 4, passing through slotted holes in the strut and through the body, as shown in Fig. 6, or by any other suitable means, and the opposite end of the strut is held in connection with the truss bar by lips 5, formed on the end of the strut and turned over on the truss bar. The initial tension may be imparted to the truss bar by heating and shrinking the beam on to the strut, or by the use of a turnbuckle or any other well known means of producing tension in rods.

The strut 3 is provided with an open sided recess to receive the body, adjacent to the end which fits over the same, so as to be placed thereon laterally, and is held, as against lateral displacement, by a cap 9, secured to the body by rivets or pins 10. In such case, the strut is put in by pulling on the truss bar, and spreading the same away from the body a sufficient distance to allow the strut to be slipped laterally in position, after which the cap 9 is secured to the body, and the lips 5 turned over on the truss bar.

The end bearings 11, upon which the brake heads 12 are fitted, are preferably made of trapezoidal or dovetail form in cross section, as shown in Fig. 2, in order to hold the brake heads more securely. A filling piece 13, of wrought iron or other material that can be welded is inserted into each end of the hollow body 1, and the body, the filling piece, and the adjacent portion of the truss bar at each end, are then all welded together, and swaged into the form desired to receive the brake head, which is suitably recessed to fit over the bearing, as shown in Figs. 2 and 5, and secured removably thereto preferably by a rivet or bolt 14.

It will be seen that by this construction, the body of the beam and the ends of the truss bar are firmly connected, and all liability to looseness or separation in service is obviated. A simple and substantial bearing or support for each brake head is provided, and either or both brake heads may be removed, and another head or heads substituted, whenever required, with facility and dispatch, and without impairing or affecting the strength or integrality of the brake beam structure, or involving any skill beyond that of operatives accustomed to making yard or running repairs or adjustments of appliances connected with car trucks.

I claim as my invention and desire to secure by Letters Patent—

1. The combination, substantially as set forth, of a tubular body, end filling pieces, and a truss bar, these members being welded together at and adjacent to the ends of the body, and brake heads recessed to fit over end bearings so formed.

2. The combination, substantially as set forth, of a tubular body, end filling pieces and a truss bar, all welded together at and adjacent to the ends of the body, brake heads recessed to fit over end bearings so formed, and rivets or bolts holding said brake heads removably in position on said end bearings.

3. The combination, substantially as set forth, of a tubular body, a truss bar welded at its ends to said body, a strut or post interposed between the body and the truss bar intermediate of their ends and having an open sided recess near one of its ends to fit over the body, a cap closing the open side of the recess in the strut, and rivets or bolts securing said cap to the strut.

DAVID L. BARNES.

Witnesses:
J. SNOWDEN BELL.
T. J. HOGAN.